(12) United States Patent  
Gomes

(10) Patent No.: US 9,524,202 B2  
(45) Date of Patent: *Dec. 20, 2016

(54) COMMUNICATION SOFTWARE STACK OPTIMIZATION USING DISTRIBUTED ERROR CHECKING

(71) Applicant: International Business Machines Corporation, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/839,024

(22) Filed: Aug. 28, 2015

(65) Prior Publication Data

US 2016/0124790 A1    May 5, 2016

Related U.S. Application Data

(63) Continuation of application No. 14/533,337, filed on Nov. 5, 2014.

(51) Int. Cl.
| | |
|---|---|
| *G06F 11/00* | (2006.01) |
| *G06F 11/07* | (2006.01) |
| *G06F 13/00* | (2006.01) |
| *G06F 9/46* | (2006.01) |

(52) U.S. Cl.
CPC ............. *G06F 11/0721* (2013.01); *G06F 9/46* (2013.01); *G06F 11/0745* (2013.01); *G06F 11/0751* (2013.01); *G06F 11/0787* (2013.01); *G06F 13/00* (2013.01)

(58) Field of Classification Search
CPC . G06F 11/079; G06F 11/0751; G06F 11/0772; G06F 11/0787; G06F 11/0703; G06F 11/0745; H04L 12/2694
See application file for complete search history.

(56) References Cited

U.S. PATENT DOCUMENTS

| | | | |
|---|---|---|---|
| 6,208,616 B1 * | 3/2001 | Mahalingam | G06F 1/20 370/216 |
| 7,363,550 B2 * | 4/2008 | Pierce | G06F 11/0709 714/38.14 |
| 9,244,754 B2 * | 1/2016 | Wang | H04L 12/2859 |

(Continued)

*Primary Examiner* — Yolanda L Wilson  
(74) *Attorney, Agent, or Firm* — Cantor Colburn LLP; Steven Chiu

(57) ABSTRACT

A method of processing a request message begins when a first layer of a plurality of layers of a system stack receives the request message. In turn, the plurality of layers negotiate an agreement based on the request message, where the agreement indicates which layers will process particular error reply codes of an error reply code list. Then, a non-controller layer of the plurality of layers performs a first error check in accordance with the agreement and records a first error result in a communication interface based on the first error check; a controller layer of the plurality of layers performs a second error check in accordance with the agreement and records a second error result in the communication interface based on the second error check. Then a reply message responsive to the request message is outputted based on the first error check and the second error check.

9 Claims, 11 Drawing Sheets

(56) References Cited

U.S. PATENT DOCUMENTS

2009/0210607 A1* 8/2009 Hanscom ............ G06F 11/0745
710/315
2009/0319836 A1* 12/2009 Khatri ................. G06F 11/0745
714/57

* cited by examiner

Bit Format 900

| BIT | DESCRIPTION |
|---|---|
| 0 | RC = 10 |
| 1 | RC = 20 |
| 2 | RC = 30 |
| 3 | RC = 40 |
| 4 | RC = 50 |
| 5 | RC = 60 |
| 6 | RC = 70 |
| 7 | Unassigned |

FIG. 9

Bit Format 1000

| BIT | DESCRIPTION |
|---|---|
| 0 | CPU Hardware |
| 1 | CPU Firmware |
| 2 | Transport Layer |
| 3 | Device Driver |
| 4 | Device Firmware |
| 5 | Device Hardware |
| 6 | Unassigned |
| 7 | Unassigned |

FIG. 10

COMMUNICATION SOFTWARE STACK OPTIMIZATION USING DISTRIBUTED ERROR CHECKING

DOMESTIC PRIORITY

This application is a continuation of U.S. application Ser. No. 14/533,337, filed on Nov. 5, 2014, the disclosure of which is incorporated by reference herein in its entirety.

BACKGROUND

The present disclosure relates generally to optimizing a communication software stack to provide error checking, and more specifically, to a common communication interface available to all layers of the communication software stack for intercommunication that provides distributed error checking using specific reply and source fields.

In general, central processing unit ("CPU") firmware of a software stack communicates with input/output ("I/O") device firmware of the same software stack to perform enqueue and dequeue operations in response to messages by an application program. Further, the I/O device firmware inspects each message for content validity, and if any invalid content is found, the I/O device firmware generates an error reply message with an error code. However, all information required to check for all possible error codes may not be available to the I/O device firmware, which makes it impossible for the I/O device firmware to check for all possible error codes and generate an appropriate error reply message with the appropriate error code on its own.

To account for this issue, one mechanism is to store, by the CPU firmware, all the needed information in each message's message information block ("MIB") in hardware system area ("HSA"), which is then used by the I/O device firmware to check all the error codes. Yet, because the HSA space is limited, this mechanism requires HSA space that may not be available to the CPU firmware, which is compounded as the number of MIBs that are needed to keep track of the I/O device elements grow. A second mechanism is to allow the CPU firmware to generate error reply messages with the error codes; however, because this mechanism requires the CPU firmware to generate adapter interrupts, the size, complexity, and firmware overlap of CPU firmware code increases. Further, with this second mechanism, the CPU firmware checks all the higher priority error codes before the lower priority error codes to avoid breaking the error code priority. Then, if the error code checks by the CPU firmware do not fail, the I/O device firmware checks duplicate the same higher priority error codes that the CPU firmware already performed, which causes performance degradation. A third mechanism is to introduce additional systems architecture; however, this would also require more work by the CPU and/or I/O device firmware to generate the appropriate error reply, as well as more work by the application to add the new architecture support.

SUMMARY

Embodiments include a method, system, and computer program product for optimizing a communication software stack and utilizing a distributed error checking. A method includes receiving a request message, by a first layer of a plurality of layers of a system stack; negotiating an agreement based on the request message, by the plurality of layers, the agreement indicating which layers of the plurality of layers will process particular error reply codes of an error reply code list; performing a first error check, by a non-controller layer of the plurality of layers, in accordance with the agreement; recording a first error result in a communication interface based on the first error check, by the non-controller layer of the plurality of layers; performing a second error check, by a controller layer of the plurality of layers, in accordance with the agreement; recording a second error result in the communication interface based on the second error check, by the controller layer of the plurality of layers; and outputting a reply message responsive to the request message based on the first error check and the second error check.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 9 illustrates a bit format example of a processing system in accordance with an embodiment;

FIG. 10 illustrates another bit format of a processing system in accordance with an embodiment.

DETAILED DESCRIPTION

Embodiments described herein relate to a common communication interface for layers of a communication software stack of a processing system. The common communication interface enables the layers, which include a CPU firmware and an I/O firmware, to communicate messages that provide distributed error checking using specific reply and source fields. In this way, the common communication interface overcomes the inability of the I/O device firmware to check for all possible error codes in the processing system by leveraging the CPU firmware in a cooperative fashion, since the CPU firmware knows the information that the I/O device firmware does not.

Figure 1:
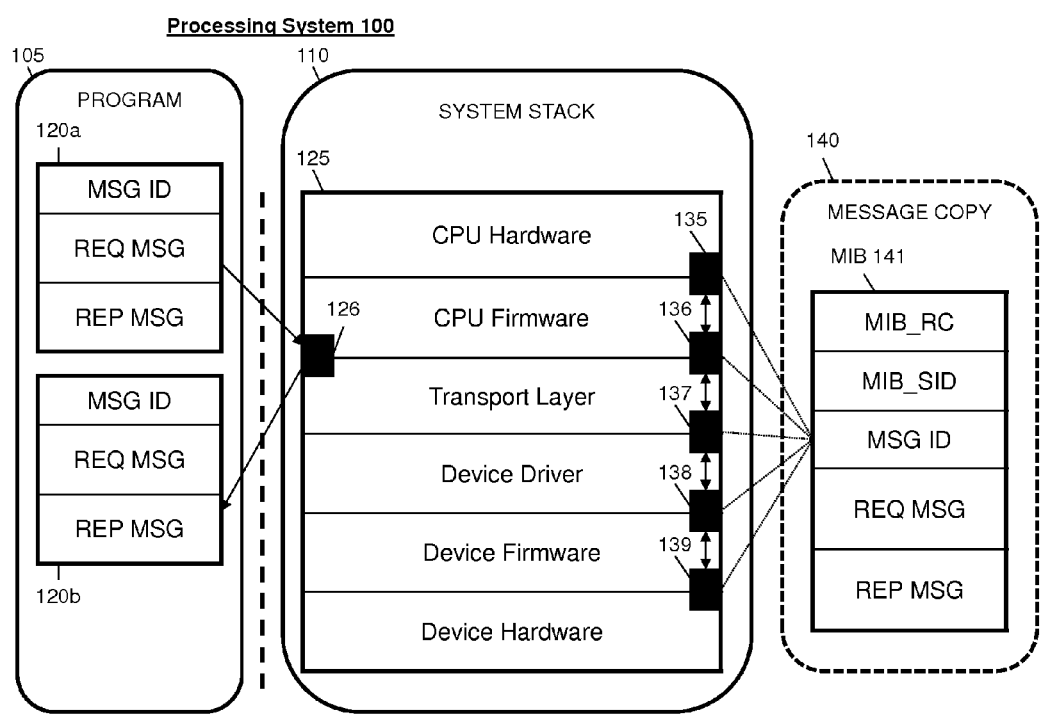
FIG. 1 depicts a communication stack of a processing system in accordance with an embodiment.

Turning now to FIG. 1, a set of system stack layers of an I/O device configuration of a connected I/O device and a common communication interface is generally shown in accordance with an embodiment of a processing system 100. As illustrated, the processing system 100 includes a program 105 and a system stack 110.

The program 105 communicates/receives messages 120 (e.g., a request message 120a and reply message 120b) that include a message identification field ("MSG ID"), a request message field ("REQ MSG") that indicates an error checking request, and a reply message field ("REP MSG") that indicates an error checking result. The message identification, which is operable to identify/correlate related messages (e.g., messages 120a, 120b), may be processed and propagated within the processing system 100.

The system stack 110 includes a plurality of layers 125 that are grouped into two different types of layers (e.g., controller and non-controller). The non-controller layer(s) check for agreed upon error reply codes ("ERC(s)") and generate values that correspond to the check. The controller layer(s) also check for agreed upon ERCs and generate values, along with inspect the values generated by non-controller layer. Further, as illustrated in block 135-139, when messages 120 are received by a first layer of the system stack 110 (e.g., the CPU firmware at block 126), message copies 140 (e.g., common communication interface) are generated and driven between some or all of the plurality of layers 125, depending on a type of error to provide distributed error checking.

Further, to provide the distributed error checking, a message information block ("MIB") 141 of the message copy 140 is retained and updated during each check. The MIB 141 contains information about a corresponding enqueued request message (e.g., request message 120a) and information about generating a corresponding reply message (e.g., reply message 120b). The MIB 141 is further illustrated as including a reply code ("MIB_RC"), a source identification ("MIB_SID"), a message identification ("MSG ID"), a REQ MSG, and a REP MSG. The MIB_RC is a field in which the non-controller layer(s) respectively store, as an MIB_RC value and/or an ERC value (e.g., the value corresponding to the particular check). The MIB_SID is a field in which a MIB_SID value, an identification value of that non-controller layer(s), is stored.

In general, when the program 105 enqueues the request message 120a at block 126, the CPU firmware of the system stack 110 stores that request message 120 into a designated location in hardware system area ("HSA") of the processing system 100. In addition, each layer of the system stack 110 agrees on which layer is checking which ERC using an ERC list to eliminate duplicate or missing ERC checking Further, each layer of the system stack 110 agrees upon which MIB_RC and MIB_SID fields locations in MIB 141 are used later to generate/inspect a recognized ERC (and to produce the reply message 120b).

Next, the CPU firmware generates the message copy 140 to include a MSG ID that corresponds to the request message 120a, along with information about the enqueued request message 120a in the REQ MSG. Once generated, the CPU firmware indicates that the message copy 140 is ready to be processed by the plurality of layers 125 (e.g., some of which are respective to a particular input/output ("I/O") device of this general example). Then, each layer, such as the I/O device firmware (e.g., Device Firmware of FIG. 1) inspects, its associated portion of the processing system 100 based upon priority and/or non-priority levels and the agreed upon ERCs for content validity in accordance with the information presented by the MIB 141 of the message copy 140 (note that priority and non-priority based ERC checking are mutually exclusive; and thus either priority or non-priority based ERC checking may be implemented based on architecture specification of the processing system 100). If any invalid content is found, the layer that discovered the invalid content updates the MIB 141 with an error reply code ("ERC") corresponding to the invalidity in the MIB_RC and a source identification that identifies that layer in the MIB_SID. In a non-error case, the MIB_RC is set to zero to indicate there are no errors and the MIB_SID is set to zero to indicate that the current layers is not generating any errors. Therefore, on each pass between each level, the error checking results are maintained in the MIB 141 using MIB_RC and MIB_SID.

Once the error checking is complete, the reply message ("REP MSG") in MIB 141 is generated in accordance with completing the REP MSG of the MIB_RC and MIB_SID of MIB 141 and then copied into a designated location in hardware system area ("HSA") of the processing system 100. When the program 105 requests to dequeue the reply message, the CPU firmware copies the reply message from a designated location in hardware system area ("HSA") of the processing system 100 into the reply message ("REP MSG") 126b, so that the program 105 is aware of the error checking results. In this way, the combined effort of each layer of the system stack 110 results in a full check of all possible ERC and a complete error reply message (e.g., message 120b) corresponding to the original request message (e.g., message 120a).

Figure 2:
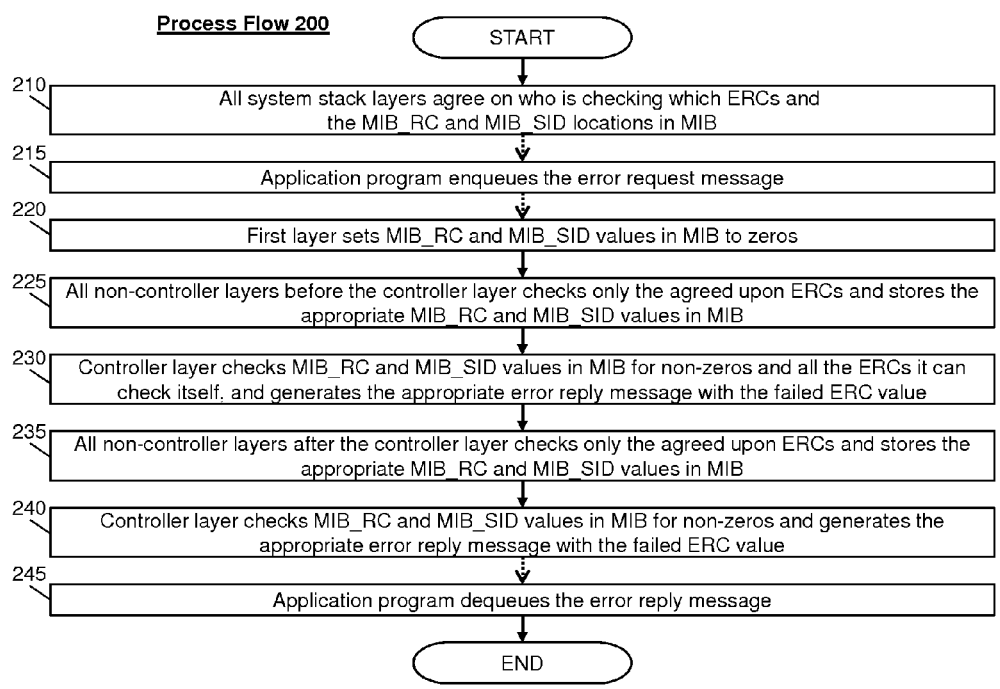
FIGS. 2 illustrates a process flow of a processing system in accordance with an embodiment.

FIG. 2 illustrates a process flow 200 of an overall error reply message generation of the processing system 100 in accordance with an embodiment. That is, the process flow 200 illustrates how the plurality of layers 125 of the system stack 110 work cooperatively to generate the appropriate reply message 120b with the appropriate ERC for a given request message 120a received by the system stack 110 from the program 105 that includes a request for error checking in REQ MSG and has a REP MSG. Further, the reply message 120b is returned to the program 105 from the system stack with REP MSG indicating the results of the error check. Note these messages 120a, 120b, since they correspond, include the same value for MSG ID.

The process flow 200 begins at block 210 where the plurality of layers 125 of the system stack 110 agree on which layer is checking which ERCs using the entire ERCs list to eliminate duplicate or missing ERC checking. Further, agreed upon MIB_RC and MIB_SID field locations in a future MIB 141 are also selected for later use (e.g., to generate and inspect the recognized ERC, and to produce the reply message 120b). Next, in block 215, the program 105 requests to enqueue the request message 120a. In response, at block 220, a first layer (e.g., the CPU firmware) copies the request message 120a from the program storage into the designated location and initializes the values in MIB_RC and MIB_SID of the MIB 141 of that message copy 140 with zeros.

Next, the process flow 200 proceeds to block 225, where the non-controller layers of the plurality of layers 125 check only the agreed upon ERCs before the controller layers of the plurality of layers 125 in accordance with a front-end priority processing. The non-controller layers also store the appropriate values in MIB_RC and MIB_SID of the MIB 141 of the message copy 140. Note that the operations within block 225 are further described with respect to FIG. 3 below.

Then, at block 230, the controller layers check the stored values in MIB_RC and MIB_SID of the MIB 141 from block 225 and check all the remaining ERCs of that the non-controller layers did not check in accordance with the front-end priority processing. If any errors are found, the controller layers generate the appropriate reply message 120b with the failed ERC value and/or perform recovery operations in accordance with the front-end priority processing, which in turn enables the process flow 200 to immediately proceed to END. The operations within block 230 are further described with respect to FIG. 4 below.

In addition, a back-end priority processing may be performed by the plurality of layers 125. For instance, the non-controller layers (block 235) can also check only the agreed upon ERCs before the controller layers of the plurality of layers 125 in accordance with back-end processing. Note that the operations within block 235 are further described with respect to FIG. 3 below. The controller layers (block 240) can then check the stored values in MIB_RC and MIB_SID of the MIB 141 from block 235 and check all the remaining ERCs of that the non-controller layers did not check in accordance with the back-end priority processing. If any errors are found, the controller layers generate the appropriate reply message 120b with the failed ERC value and/or perform recovery operations in accordance with the back-end priority processing, which in turn enables the process flow 200 to immediately proceed to END. The controller back-end priority processing is further described with respect to FIG. 5 below.

The plurality of layers 125 can also perform a non-priority processing of non-priority ERCs that were agreed upon in block 210, if the architecture does not require priority ERC processing. At block 225, the non-controller layers perform non-priority processing of the agreed upon non-priority ERCs, as further described with respect to FIG. 6 below; at block 230, the controller layer performs non-priority processing of the remaining agreed upon non-priority ERCs, as further described with respect to FIG. 7 below.

In addition, a back-end non-priority processing may be performed by the plurality of layers 125. For instance, the non-controller layers (block 235) can also perform non-priority processing of the agreed upon non-priority ERCs, as further described with respect to FIG. 6 below; at block 240, the controller layer performs non-priority processing of the remaining agreed upon non-priority ERCs, as further described with respect to FIG. 8 below.

Then, at block 245, the program 105 dequeues the reply message 120b, as produced by any of the previous block, which in turn enables the process flow 200 to END. In addition, it is noted that the broken arrows between blocks 210 and 215, 215 and 220, and 240 and 245 indicate that there may be delay in processing on either side of the broken arrow.

Figure 3:
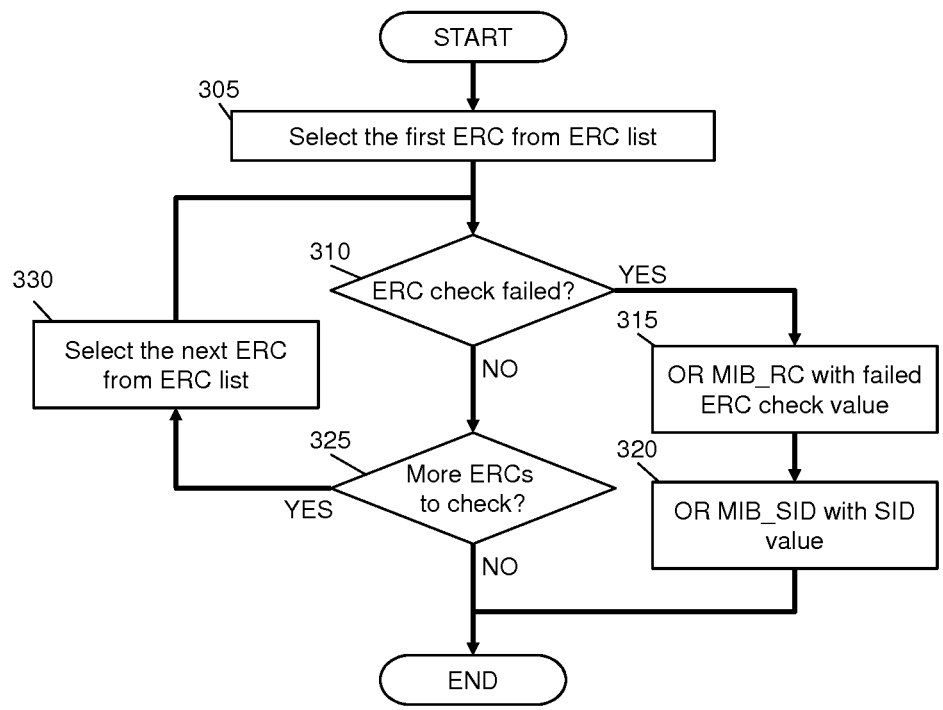
FIG. 3 illustrates a process flow by non-controller layers of a processing system in accordance with an embodiment.

FIG. 3 illustrates a process flow 300 of a processing system 100 in accordance with an embodiment with respect to non-controller layers performing priority ERC generations. In general, the priority ERC generation process of FIG. 3 is a front-end process by each front-end non-controller layer of the system stack 110, where each front-end non-controller layer controls (e.g., before the controller layer) and starts inspection of the message copy 140 for content validity. Note that each front-end non-controller layer checks for only the agreed upon ERCs, one at a time, starting with the highest priority ERC and ending with the lowest priority ERC.

Starting at block 305 of FIG. 3, a front-end non-controller layer selects, as a current ERC, the highest priority ERC from the ERC list. Then, at decision block 310, the front-end non-controller layer determines whether the message copy 140 includes invalid values that would result in the current ERC. If it does (e.g., as indicated by the 'YES' arrow), then the non-controller layer ORs in the failed ERC value with the current MIB_RC value, at block 315, and ORs in its SID value with the current MIB_SID value in the MIB 141 of the message copy 140, at block 320. In turn, the process flow 300 proceeds to END, and the processing system 100 proceeds to the operations of FIG. 4. Otherwise (e.g., as indicated by the 'NO' arrow), the non-controller layer determines whether there are more ERCs left to be checked at decision block 325. If there is another ERC left to be checked (e.g., as indicated by the 'YES' arrow), then the non-controller layer moves to the next ERC checkpoint to select the next highest priority ERC from the ERC list (e.g., block 330) and continues to check the next ERC as the current ERC (e.g., block 310). If there are no other ERC left to be checked (e.g., as indicated by the 'NO' arrow), the ERC checking is complete. In turn, the process flow 300 proceeds to END, and the processing system 100 proceeds to the operations of FIG. 4.

Figure 4:
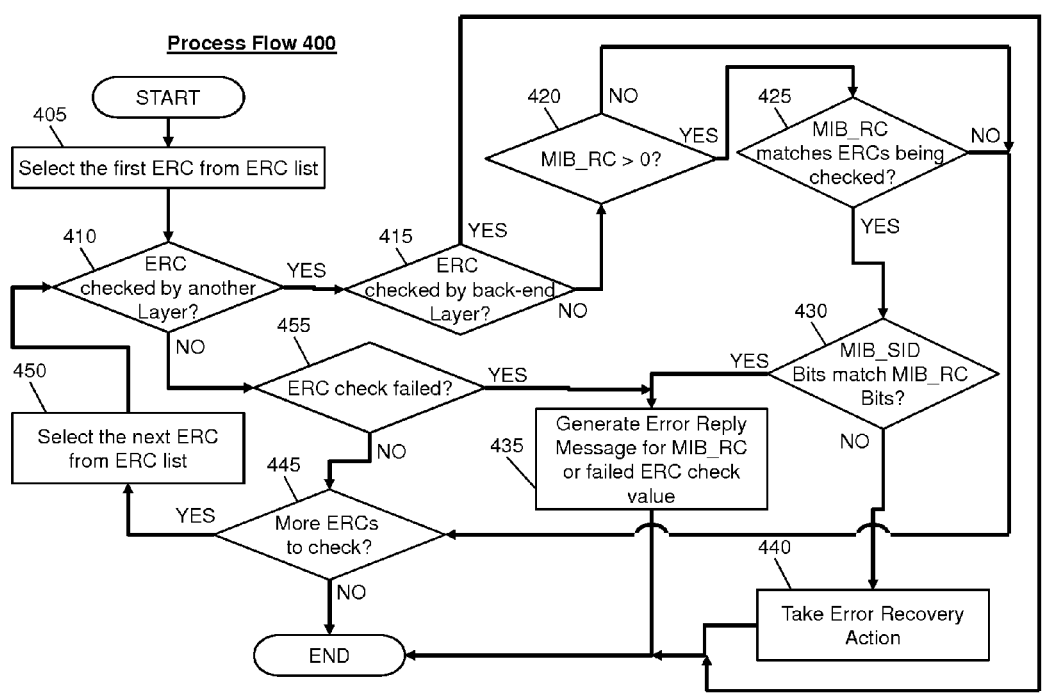
FIG. 4 illustrates a process flow of controller layers of a processing system in accordance with an embodiment.

FIG. 4 illustrates a process flow 400 of a processing system 100 in accordance with an embodiment with respect to controller layers performing priority ERC generations. In general, the priority ERC generation process of FIG. 4 is a front-end process by a front-end controller layer of the system stack 110, where the front-end controller layer controls and inspects the message copy 140 for content validity by starting with the highest priority ERC and ending with the lowest priority ERC. Further, the controller layer checks for these ERC to determine if a current ERC matches the ERC value in the corresponding MIB 141 that has been already generated by the non-controller layer (e.g., from the priority ERC generations of FIG. 3).

Starting at block 405 of FIG. 4, a controller layer checks, as a current ERC, the highest priority ERC from the ERC list. For instance, the controller layer selects one at a time the ERCs as a current ERC, starting with the highest priority ERC and ending with the lowest priority ERC that it is able to check (e.g., just before the point where the next priority ERC is being checked by the non-controller layer in the back-end). Then, at decision block 410, the controller layer determines whether the current ERC is supposed to be checked by the non-controller layer based on prior agreement. If yes, then the process flow 400 proceeds to decision block 415 (e.g., as indicated by the 'YES' arrow) where the controller layer determines if the current ERC is supposed to be checked by the back-end non-controller layer. If yes, then the front-end controller layer processing is complete; the process flow 400 proceeds to END (e.g., as indicated by the 'YES' arrow); and the processing system proceeds with back-end priority processing by the non-controller layers. If no, then the current ERC was supposed to be checked by the front-end non-controller layer based on prior agreement and the process flow 400 proceeds to decision block 420 (e.g., as indicated by the 'YES' arrow).

At decision block 420, the controller layer determines if the MIB_RC (e.g., of MIB 141) is greater than zero. If the MIB_RC is greater than zero, then the process flow 400 proceeds to decision block 425 (e.g., as indicated by the 'YES' arrow) where the controller layer determines if the current ERC matches the ERC value in the corresponding MIB 141 of the message copy 140 (e.g., that should have been already generated by the non-controller layer). If there is a match, then the process flow 400 proceeds to decision block 430 (e.g., as indicated by the 'YES' arrow) where the controller layer determines if a number of enabled ERC bits in MIB_RC are same as the number of enabled SID bits in MIB_SID. If the number of enabled ERC bits in MIB_RC are same as the number of enabled SID bits in MIB_SID, then the process flow 400 proceeds to block 435 (e.g., as indicated by the 'YES' arrow) where the controller layer uses the MIB_RC value to generate the appropriate reply message 120b. In turn, the ERC checking process concludes, and the process flow 400 proceeds to END. Otherwise, the process flow 400 proceeds to block 440 (e.g., as indicated by the 'NO' arrow) where the controller layer performs an error recovery action.

Returning to decision blocks 420 and 425, if the controller layer determines that the MIB_RC is not greater than zero or that the current ERC does not match the ERC value in the MIB_RC, then the process flow 400 proceeds to decision block 445 (e.g., as indicated by the 'NO' arrows) where the controller layer determines if there are more ERCs that needs to be checked. If it is determined that there are more ERCs left to be checked, then the process flow 400 proceeds to block 450 (e.g., as indicated by the 'YES' arrow) where the controller layer moves to a next ERC checkpoint to select the next ERC as the current ERC based on priority. The controller layer continues to check the current ERC as described above by returning to decision block 410. Otherwise, the ERC checking process concludes and the process flow 400 proceeds to END (e.g., as indicated by the 'NO' arrow). In turn, the back-end priority processing by the non-controller layers proceeds.

Returning to decision block 410, if the controller layer determines that the current ERC is not supposed to be checked by the non-controller layer based on prior agreement, then the process flow 400 proceeds to decision block 455 (e.g., as indicated by the 'NO' arrow). At decision block 455, the controller layer checks the applicable request message fields values to see if any of them would result in the current ERC (e.g., determines whether one of the ERC checks failed). If yes, then the process flow 400 proceeds to block 435 (e.g., as indicated by the 'YES' arrow) where the controller layer uses the MIB_RC value to generate the appropriate reply message 120b. In turn, the ERC checking process concludes and the process flow 400 proceeds to END. Otherwise, the process flow 400 proceeds to decision block 445 (e.g., as indicated by the 'NO' arrows) where the controller layer checks to see if there are more ERCs that needs to be checked. As indicated above, the back-end priority processing by the non-controller layers proceeds if it is determined that there are more ERCs left to be checked.

Figure 5:
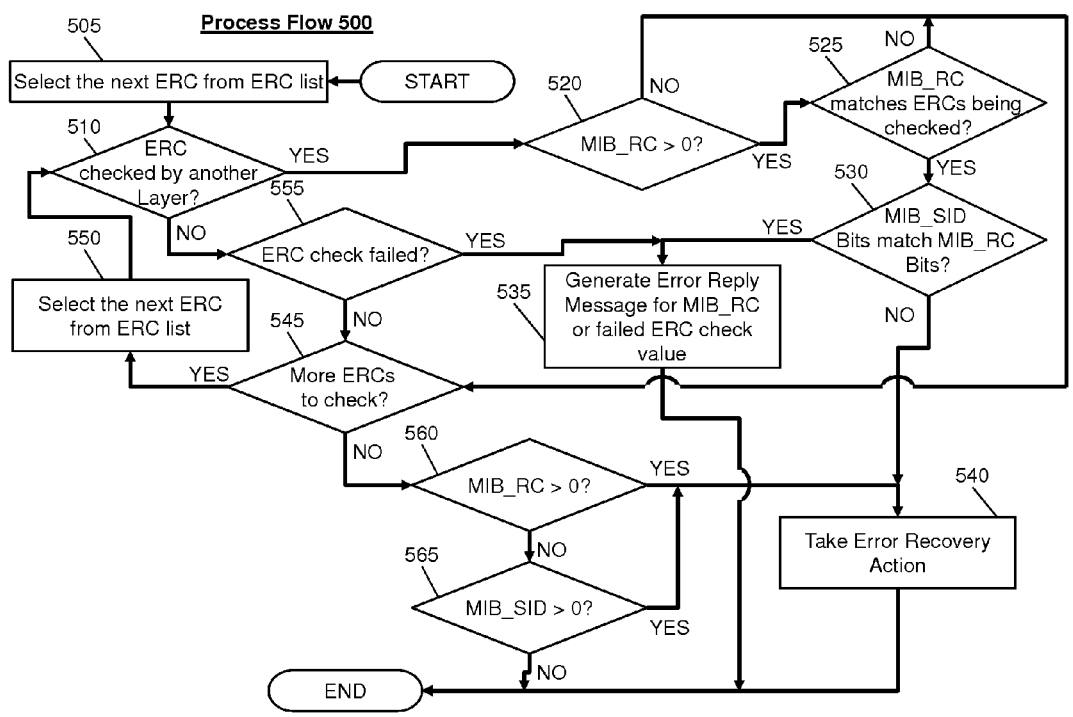
FIG. 5 illustrates another process flow of controller layers of a processing system in accordance with an embodiment.

The priority ERC generation process can include the back-end priority processing by the back-end non-controller layers of the system stack 110, where each back-end non-controller layer similarly controls (e.g., before the controller layer) inspection of the message copy 140 for content validity. That is, the back-end process is generally same as the front-end non-controller layer process of FIG. 3, except for the back-end non-controller layers inspect the message copy 140 for content validity after the front-end controller layer inspects the message copy 140 for content validity (e.g., after FIG. 4). The priority ERC generation process can also include a back-end priority processing by the controller layer of the system stack 110; FIG. 5 illustrates a process flow 500 of a processing system 100 in accordance with an embodiment with respect to controller layers performing priority back-end ERC generation. In general, the controller layer back-end process enables the controller layer to control and start inspection of the message copy 140 for content validity by starting with the next highest priority ERC (e.g., where the front-end controller layer stopped processing) and ending with the lowest priority ERC.

Starting at block 505 of FIG. 5, a controller layer selects, as a current ERC, the highest priority ERC from the ERC list. For instance, the controller layer selects the rest of the ERCs if any (e.g., where the front-end controller layer stopped processing) one at a time, starting with the highest priority ERC and ending with the lowest priority ERC. Then, at decision block 510, the controller layer determines whether the current ERC is supposed to be checked by the non-controller layer based on prior agreement. If yes, then the process flow 500 proceeds to decision block 520 (e.g., as indicated by the 'YES' arrow).

At decision block 520, the controller layer determines if the MIB_RC (e.g., of MIB 141) is greater than zero. If the MIB_RC is greater than zero, then the process flow 500 proceeds to decision block 525 (e.g., as indicated by the 'YES' arrow) where the controller layer determines if the current ERC matches the ERC value in the corresponding MIB 141 (e.g., that should have been already generated by the non-controller layer). If there is a match, then the process flow 500 proceeds to decision block 530 (e.g., as indicated by the 'YES' arrow) where the controller layer determines if a number of enabled ERC bits in MIB_RC are same as the number of enabled SID bits in MIB_SID of the MIB 141. If the number of enabled ERC bits in MIB_RC are same as the number of enabled SID bits in MIB_SID, then the process flow 500 proceeds to block 535 (e.g., as indicated by the 'YES' arrow) where the controller layer uses the MIB_RC value to generate the appropriate reply message 120b. In turn, the ERC checking process concludes and the process flow 500 proceeds to END. Otherwise, the process flow 500 proceeds to block 540 (e.g., as indicated by the 'NO' arrow) where the controller layer performs an error recovery action.

Returning to decision blocks 520 and 525, if the controller layer determines that the MIB_RC is not greater than zero or that the current ERC does not match the ERC value in the MIB_RC, then the process flow 500 proceeds to decision block 545 (e.g., as indicated by the 'NO' arrows) where the controller layer checks to see if there are more ERCs that needs to be checked. If it is determined that there are more ERCs left to be checked, then the process flow 500 proceeds to block 550 (e.g., as indicated by the 'YES' arrow) where the controller layer moves to a next ERC checkpoint to select next ERC as the current ERC based on priority. The controller then continues to check the current ERC as described above by returning to decision block 510.

Returning to decision blocks 510 and 545, if the controller layer determines that the current ERC is not supposed to be checked by the non-controller layer based on prior agreement, then the process flow 500 proceeds to decision block 555 (e.g., as indicated by the 'NO' arrow). At decision block 555, the controller layer checks the applicable field values of the REQ MSG of MIB 141 to see if any of them would result in the current ERC (e.g., determines whether one of the ERC checks failed). If yes, then the process flow 700 proceeds to block 535 (e.g., as indicated by the 'YES' arrow) where the controller layer uses the MIB_RC value to generate the appropriate reply message 120b. In turn, the ERC checking process concludes and the process flow 500 proceeds to END. Otherwise, the process flow 500 proceeds to decision block 545 (e.g., as indicated by the 'NO' arrow) where the controller layer checks to see if there are more ERCs that needs to be checked.

At decision block 545, if it is determined that there are no more ERCs left to be checked, then the process flow 500 proceeds to decision block 560 (e.g., as indicated by the 'NO' arrow) where the controller layer determines if the MIB_RC is greater than zero. If the MIB_RC is greater than zero, then the controller layer performs error recovery action at block 540 and the ERC checking process concludes. If the MIB_RC is not greater than zero, then the controller layer determines if the MIB_SID is greater than zero at decision block 565. If the MIB_SID is greater than zero, then the controller layer performs error recovery action at block 540 and the ERC checking process is complete. Otherwise, the ERC checking process concludes; the process flow 500 proceeds to END.

Figure 6:
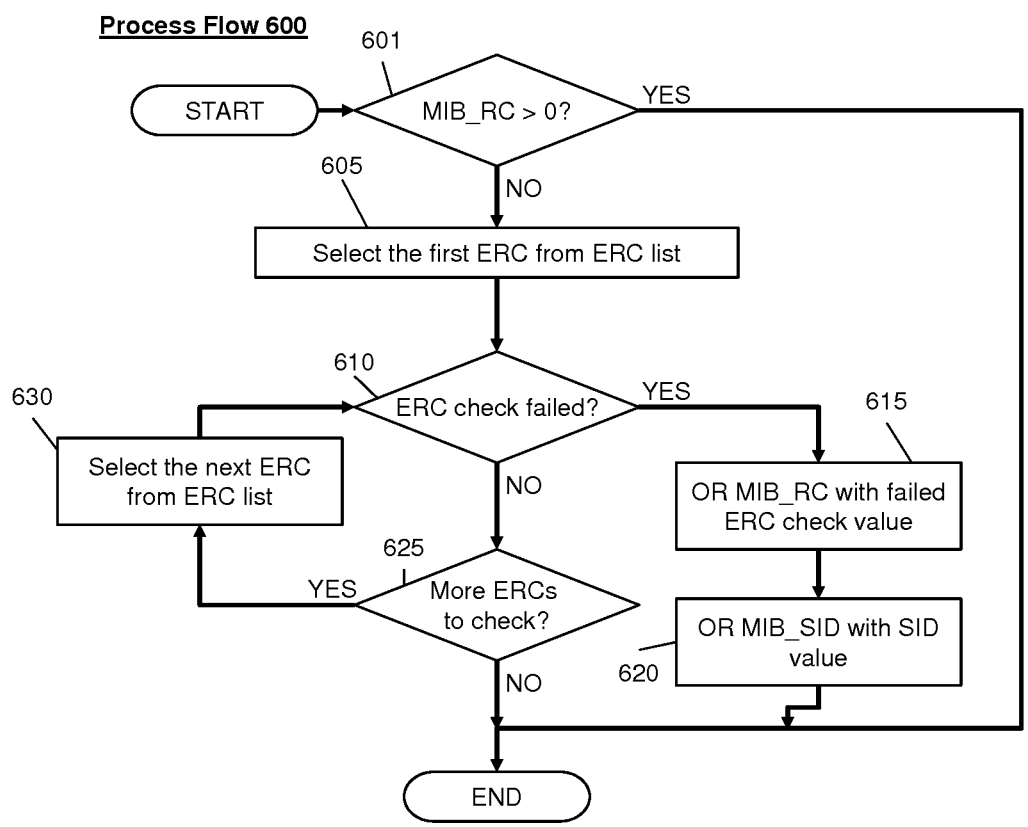
FIG. 6 illustrates another process flow of non-controller layers of a processing system in accordance with an embodiment.

If the architecture does not require priority ERC processing, then non-priority ERC processing may be performed (instead of priority ERC processing) by the processing system 100. A non-priority ERC generation process is simpler and more efficient. It can include the front-end non-priority processing by the front-end non-controller layers of the system stack 110, where each front-end non-controller layer controls (e.g., before the controller layer) inspection of the message copy 140 for content validity. Note that each front-end non-controller layer checks for only the agreed upon ERCs. FIG. 6 illustrates a process flow 600 of a processing system 100 in accordance with an embodiment with respect to non-controller layers performing non-priority ERC generation.

Starting at decision block 601 of FIG. 6, a front-end non-controller layer determines if the MIB_RC of 141 is greater than zero. If it is, then the ERC has already been set by one of the previous layer so there is no need to check for more ERC. In turn, the ERC checking process concludes; the process flow 600 proceeds to END; and the processing system 100 proceeds to the operations of FIG. 7. Otherwise, the process flow 600 proceeds to decision block 605, where the non-controller layer selects, as a current ERC, the first ERC from the ERC list. Then, at decision block 610, the non-controller layer determines whether the message copy 140 includes invalid values that would result in the current ERC. If it does (e.g., as indicated by the 'YES' arrow), the non-controller layer ORs in the failed ERC value with the current MIB_RC value, at block 615, and ORs in its SID value with the current MIB_SID value in the MIB 141, at block 620. In turn, the process flow 600 proceeds to END and the processing system 100 proceeds to the operations of FIG. 7. Otherwise (e.g., as indicated by the 'NO' arrow), the non-controller layer determines whether there are more ERCs left to be checked at decision block 625. If there is another ERC left to be checked (e.g., as indicated by the 'YES' arrow), then the non-controller layer moves to the next ERC checkpoint (e.g., select the current ERC at block 630) and continues to check the next ERC as described above (e.g., block 610). If there are no other ERC left to be checked (e.g., as indicated by the 'NO' arrow), the ERC checking is complete and the process flow 600 proceeds to END, and the processing system 100 proceeds to the operations of FIG. 7.

Figure 7:
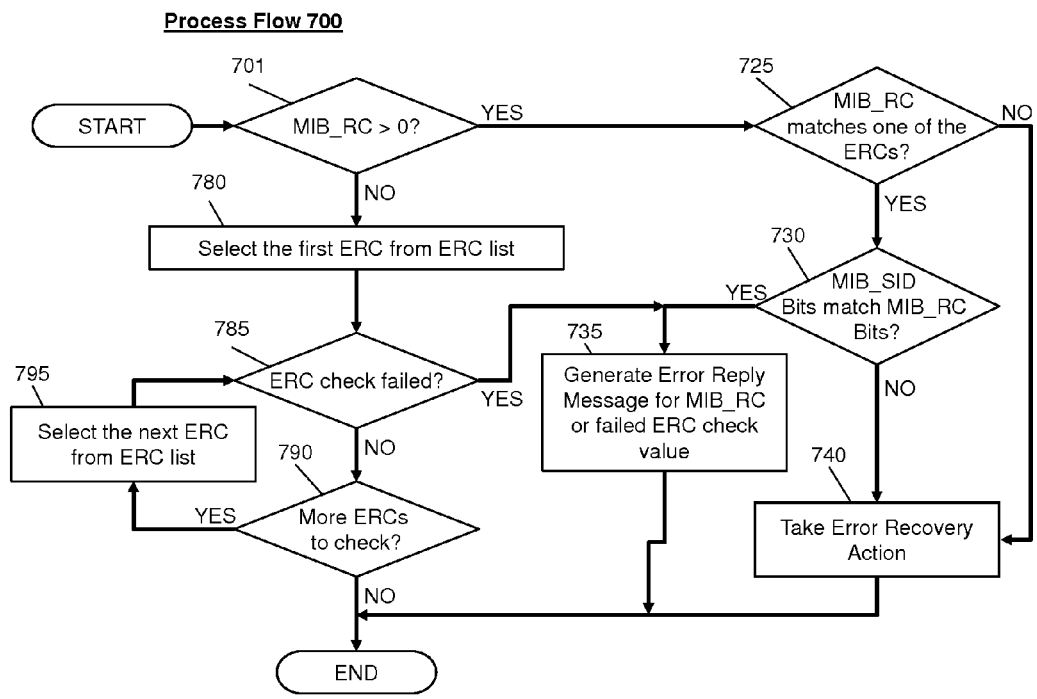
FIG. 7 illustrates another process flow of controller layers of a processing system in accordance with an embodiment.

FIG. 7 illustrates a process flow 700 of a processing system 100 in accordance with an embodiment with respect to controller layers performing non-priority ERC generation. In general, the non-priority ERC generation process of FIG. 7 is a front-end process by a front-end controller layer of the system stack 110, where the front-end controller layer controls and inspects the message copy 140 for content validity by starting with the first non-priority ERC and ending with the last non-priority ERC. Further, the controller layer checks for these ERC to determine if a current ERC matches the ERC value in the corresponding MIB 141 that has been already generated by the non-controller layer (e.g., from the non-priority ERC generation of FIG. 6).

Starting at decision block 701 of FIG. 7, a controller layer determines if the MIB_RC of MIB 141 is greater than zero. If the MIB_RC is greater than zero, then the process flow 700 proceeds to decision block 725 (e.g., as indicated by the 'YES' arrow) where the controller layer determines if the current ERC matches the ERC value in the corresponding MIB 141 (e.g., that should have been already generated by the non-controller layer). If there is no match, the process flow 700 proceeds to block 740 (e.g., as indicated by the 'NO' arrow) where the controller layer performs an error recovery action. Otherwise, the process flow 700 proceeds to decision block 730 (e.g., as indicated by the 'YES' arrow) where the controller layer determines if a number of enabled ERC bits in MIB_RC are same as the number of enabled SID bits in MIB_SID of the MIB 141. If the number of enabled ERC bits in MIB_RC are same as the number of enabled SID bits in MIB_SID, then the process flow 700 proceeds to block 735 (e.g., as indicated by the 'YES' arrow) where the controller layer uses the MIB_RC value to generate the appropriate reply message 120b. In turn, the ERC checking process concludes and the process flow 700 proceeds to END. Otherwise, the process flow 700 proceeds to block 740 (e.g., as indicated by the 'NO' arrow) where the controller layer performs an error recovery action.

Returning to decision block 701, if the MIB_RC is not greater than zero, then process flow 700 proceeds to decision block 780, where the controller layer selects, as a current ERC, the first non-priority ERC from the ERC list. Then, at decision block 785, the controller layer checks the applicable field values of the REQ MSG of MIB 141 to see if any of them would result in the current ERC (e.g., determines whether one of the ERC checks failed). If yes, then the process flow 700 proceeds to block 735 (e.g., as indicated by the 'YES' arrow) where the controller layer uses the MIB_RC value to generate the appropriate reply message 120b. In turn, the ERC checking process concludes and the process flow 700 proceeds to END. Otherwise, the process flow 700 proceeds to decision block 790 (e.g., as indicated by the 'NO' arrow) where the controller layer checks to see if there are more ERCs that needs to be checked. At decision block 790, if there is another ERC left to be checked (e.g., as indicated by the 'YES' arrow), then the controller layer moves to the next ERC checkpoint (e.g., select the current ERC at block 795) and continues to check the next ERC as described above (e.g., block 785). Otherwise, if it is determined that there are no more ERCs left to be checked, then the ERC checking process concludes and the process flow 700 proceeds to END.

Figure 8:
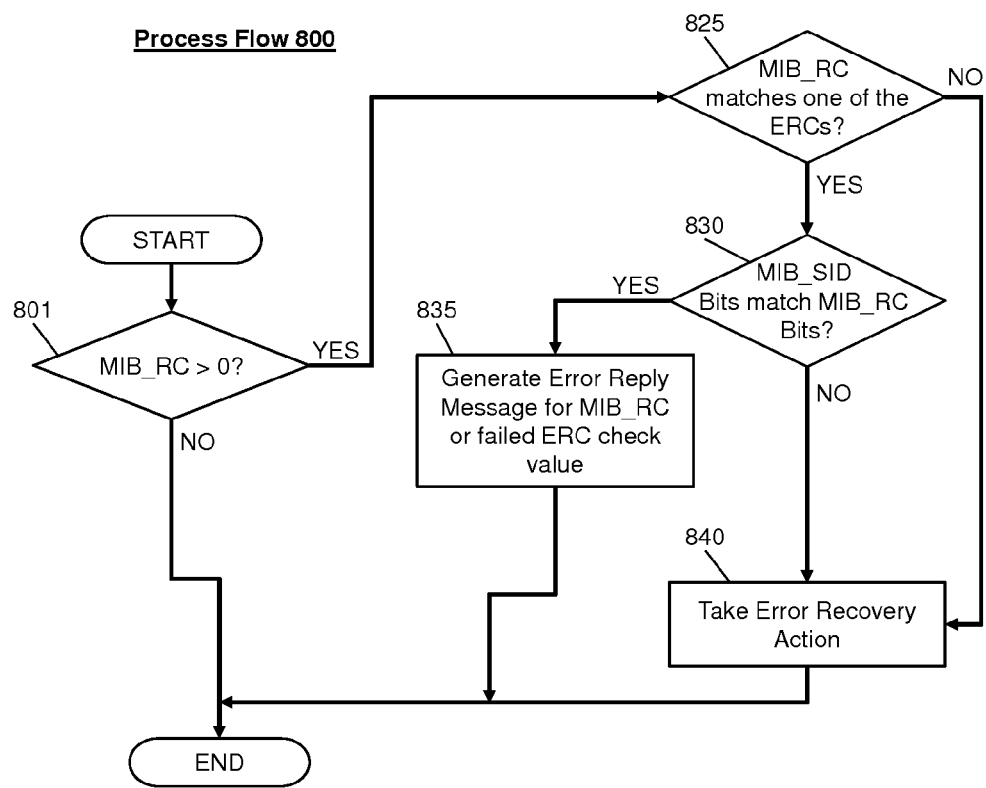
FIG. 8 illustrates another process flow of controller layers of a processing system in accordance with an embodiment.

The non-priority ERC generation process can include the back-end non-priority processing by the back-end non-controller layers of the system stack 110, where each back-end non-controller layer similarly controls (e.g., after the front-end controller layers) inspection of the message copy 140 for content validity. That is, the back-end process is generally same as the front-end non-controller layer process of FIG. 6, except for the back-end non-controller layers inspect the message copy 140 for content validity after the front-end controller layer inspects the message copy 140 for content validity (e.g., after FIG. 7). The non-priority ERC generation process can also include a back-end non-priority processing by the controller layer of the system stack 110; FIG. 8 illustrates a process flow 800 of a processing system 100 in accordance with an embodiment with respect to controller layers performing non-priority back-end ERC generation. In general, the controller layer back-end process enables the controller layer to control and start inspection of the message copy 140 for content validity by starting with the next non-priority ERC (e.g., where the front-end controller layer stopped processing) and ending with the last non-priority ERC.

Starting at decision block 801 of FIG. 8, a controller layer determines if the MIB_RC of MIB 141 is greater than zero. If the MIB_RC is greater than zero, then the process flow 800 proceeds to decision block 825 (e.g., as indicated by the 'YES' arrow) where the controller layer determines if the current ERC matches the ERC value in the corresponding MIB 141 (e.g., that should have been already generated by the non-controller layer). If there is no match, the process flow 800 proceeds to block 840 (e.g., as indicated by the 'NO' arrow) where the controller layer performs an error recovery action. Otherwise, then the process flow 800 proceeds to decision block 830 (e.g., as indicated by the 'YES' arrow) where the controller layer determines if a number of enabled ERC bits in MIB_RC are same as the number of enabled SID bits in MIB_SID of the MIB 141. If the number of enabled ERC bits in MIB_RC are same as the number of enabled SID bits in MIB_SID, then the process flow 800 proceeds to block 835 (e.g., as indicated by the 'YES' arrow) where the controller layer uses the MIB_RC value to generate the appropriate reply message 120b. In turn, the ERC checking process concludes and the process flow 800 proceeds to END. Otherwise, the process flow 800 proceeds to block 840 (e.g., as indicated by the 'NO' arrow) where the controller layer performs an error recovery action. Returning to decision block 801, if the MIB_RC is zero, there is no more agreed upon ERC to be checked by the controller layer (they have already been checked by the front-end controller layer). Thus, the ERC checking process is complete, and the process flow 800 proceeds to END.

In view of the above, the program 105 requests to dequeue of the reply message 120b, the first layer (e.g., CPU firmware in the above example) provides the reply message 120b from the designated location, the reply message being based on the MIB 141. This completes the entire enqueue and dequeue process (e.g., as illustrated in FIG. 2).

FIGS. 9 and 10 illustrate examples of bit formats of a processing system 100 in accordance with an embodiment. FIG. 9 illustrates a bit format 900 of a reply code in a MIB (e.g., MIB_RC) with defined ERCs for the processing system 100. For example, in FIG. 9, a value of 80 hex represents RC 10. FIG. 10 illustrates a bit format 1000 of a source identification in a MIB (e.g., MIB_SID) with the plurality of layers 125 of the system stack 110 for the processing system 100. For example, in FIG. 10, a value of 04 hex represents the Device Hardware Layer.

In the following operational examples, it is assumed that a CPU Firmware (e.g., the first layer) is responsible for checking RC 20, a Transport Layer (e.g., controller layer) is responsible for checking RC 10, 30, 50 and 60, a Device Driver is responsible for checking RC 70, and a Device Firmware is responsible for checking RC 40. Further, it is assumed that the request message 120a was injected with ERC 40, 50, and 70 errors.

In a priority ERC generation process example, it is assumed that Bit 0 (RC=10) has the highest priority and Bit 6 (RC=70) has the lowest priority. In turn, for the request message 120a, the CPU Firmware checks for ERC 20. If no error is detected, then the Transport Layer checks ERC 10 and 30 (but it cannot check ERC 50 or 60 because ERC 40 has higher priority and is supposed to be checked by a back-end layer). If no error is found, then the Device Driver checks ERC 70. If the Device Driver detects an error, the Device Driver ORs MIB_RC value with 02 hex (RC 70) and ORs MIB_SID value with 10 hex (its own SID value). Then, if the Device Firmware checks ERC 40 and detects an error, the Device Firmware also ORs MIB_RC value with 10 hex (RC 40) and ORs MIB_SID value with 08 hex (its own SID value). Next, the Transport Layer sees that ERC 40 is being checked by another layer, the MIB_RC value of 10 hex (RC 40) matches ERC 40, and a number of MIB_SID bits (2) matches the number of MIB_RC bits (2). Thus, the Transport Layer generates RC 40 error reply message 120b and the ERC checking process is complete. In this way, the Transport Layer found the highest priority RC (RC 40) from the possible ERCs (RC 40, 50, and 70).

In a non-priority ERC generation process example, for a given request message 120a, the CPU Firmware checks for ERC 20. If no error is detected, then the Transport Layer checks ERC 10, 30 and 50. If an error is detected for ERC 50, then the Transport Layer generates RC 50 error reply message 120b and the ERC checking process is complete. In this way, the Transport Layer did not find the highest priority ERC (RC 40) from the possible ERCs (RC 40, 50, and 70).

Figure 11:
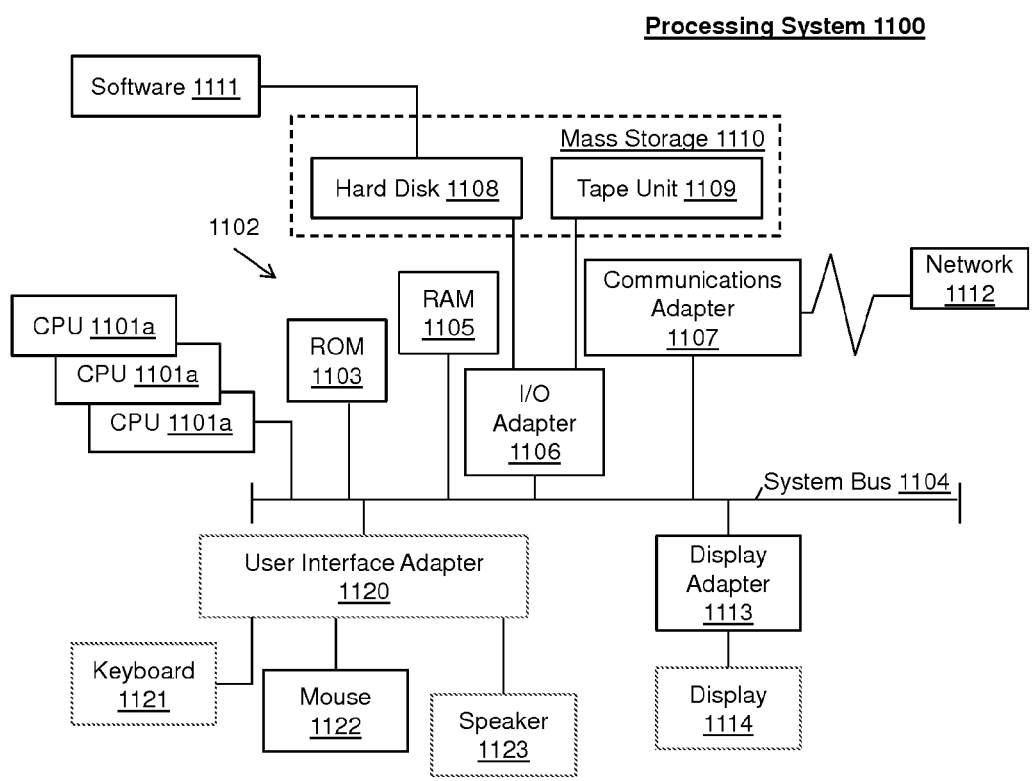
FIG. 11 illustrates a computing device schematic of a processing system in accordance with an embodiment.

Referring now to FIG. 11, there is shown an embodiment of a processing system 1100 for implementing the teachings herein. In this embodiment, the processing system 1100 has one or more central processing units (processors) 1101a, 1101b, 1101c, etc. (collectively or generically referred to as processor(s) 1101). Processors 1101, also referred to as processing circuits, are coupled to system memory 1102 and various other components via a system bus 1104. Read only memory (ROM) 1103 is coupled to system bus 1104 and may include a basic input/output system (BIOS), which controls certain basic functions of the processing system 1100. The system memory 1102 can include ROM 1103 and random access memory (RAM) 1105, which is read-write memory coupled to system bus 1104 for use by processors 1101.

FIG. 11 further depicts an input/output (I/O) adapter 1106 and a network adapter 1107 coupled to the system bus 1104. I/O adapter 1106 may be a small computer system interface (SCSI) adapter that communicates with a hard disk 1108 and/or tape storage drive 1109 or any other similar component. I/O adapter 1106, hard disk 1108, and tape storage drive 1109 are collectively referred to herein as mass storage 1110. Software 1111 for execution on processing system 1100 may be stored in mass storage 1110. The mass storage 1110 is an example of a tangible storage medium readable by the processors 1101, where the software 1111 is stored as instructions for execution by the processors 1101 to perform a method, such as the process flows of FIGS. 2-8. Network adapter 1107 interconnects system bus 1104 with an outside network 1114 enabling processing system 1100 to communicate with other such systems. A display (e.g., a display monitor) 1112 is connected to system bus 1104 by display adapter 1113, which may include a graphics controller to improve the performance of graphics intensive applications and a video controller. In one embodiment, adapters 1106, 1107, and 1113 may be connected to one or more I/O buses that are connected to system bus 1104 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1104 via user interface adapter 1120 and display adapter 113. A keyboard 1121, mouse 1122, and speaker 1123 can be interconnected to system bus 1104 via user interface adapter 1120, which may include, for example, a Super I/O chip integrating multiple device adapters into a single integrated circuit.

Thus, as configured in FIG. 11, processing system 1100 includes processing capability in the form of processors 1101, and, storage capability including system memory 1102 and mass storage 1110, input means such as keyboard 1121 and mouse 1122, and output capability including speaker 1123 and display 1112. In one embodiment, a portion of system memory 1102 and mass storage 1110 collectively store an operating system such as the z/OS or AIX operating system from IBM Corporation to coordinate the functions of the various components shown in FIG. 11.

Technical effects and benefits of embodiments of the present invention include saving CPU cycles used by CPU firmware to scatter gather all the pieces of information and then copy them to the respective MIB as well as reducing the amount of space to pass all the required information to the I/O device firmware via MIB to as little as a single byte. Further, the CPU firmware, now, does not have to implement generation of adapter interrupt which eliminates the addition of costly CPU firmware code, reduces complexity of the CPU firmware code, and prevents an over-initiative adapter interrupt. The CPU firmware would also not have to check for the same higher priority ERCs that the I/O device firmware would check later on, thus the duplicate checking of the same higher priority ERCs is eliminated. No additional systems architecture is needed to implement the embodiments described above, thus saving additional work that would be required by the CPU and/or I/O device firmware to generate an appropriate error reply as well as by the software to add the new architecture support to handle that error reply.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer executable method of processing a request message, comprising:

receiving a request message, by a first layer of a plurality of layers of a system stack;

negotiating an agreement based on the request message, by the plurality of layers, the agreement indicating which layers of the plurality of layers will process particular error reply codes of an error reply code list;

performing a first error check, by a non-controller layer of the plurality of layers, in accordance with the agreement;

recording a first error result in a communication interface based on the first error check, by the non-controller layer of the plurality of layers;

performing a second error check, by a controller layer of the plurality of layers, in accordance with the agreement;

recording a second error result in the communication interface based on the second error check, by the controller layer of the plurality of layers; and outputting a reply message responsive to the request message based on the first error check and the second error check.

2. The method of claim 1, wherein the request message comprises a message identification field that includes a message identification operable to correlate the communication interface and the reply message to the request message and a request message field that indicates an error checking request.

3. The method of claim 1, wherein the communication interface comprises a message information block operable to retain the first error result and the second error result.

4. The method of claim 1, wherein the communication interface comprises a message information block including a reply code field, a source identification field, a message identification field, a request message field, and a reply message field.

5. The method of claim 1, wherein the agreement further indicates locations for the recording of the first error result of the first error check and the recording of the second error result of the second error check.

6. The method of claim 1, wherein the agreement further indicates locations for the recording of reply codes and source identifications corresponding to the first error result and the second error check.

7. The method of claim 1, further comprising:
checking the first error result of the first error check, by the controller layer.

8. The method of claim 1, further comprising:
performing a non-priority first error check, by the non-controller layer, in accordance with the agreement.

9. The method of claim 1, further comprising:
performing a non-priority second error check, by the controller layer, in accordance with the agreement.

* * * * *